United States Patent
Schaefer et al.

(10) Patent No.: US 9,748,818 B2
(45) Date of Patent: Aug. 29, 2017

(54) METHOD AND DEVICE FOR SUPPLYING A MEASUREMENT ELECTRONICS SYSTEM WITH ELECTRICAL ENERGY

(71) Applicant: Sensus Spectrum LLC, Raleigh, NC (US)

(72) Inventors: Burghard Schaefer, Mutterstadt (DE); Volker Keller, Speyer (DE); Tuan Chu Anh, Ludwigshafen (DE)

(73) Assignee: Sensus Spectrum LLC, Raleigh, NC (US)

( * ) Notice: Subject to any disclaimer, the term of this patent is extended or adjusted under 35 U.S.C. 154(b) by 0 days.

(21) Appl. No.: 14/575,645

(22) Filed: Dec. 18, 2014

(65) Prior Publication Data
US 2015/0102603 A1    Apr. 16, 2015

Related U.S. Application Data

(63) Continuation of application No. PCT/EP2012/002577, filed on Jun. 19, 2012.

(51) Int. Cl.
| | |
|---|---|
| *H02K 7/18* | (2006.01) |
| *F03B 15/04* | (2006.01) |
| *F03B 13/00* | (2006.01) |
| *G01F 15/00* | (2006.01) |
| *G01F 15/06* | (2006.01) |
| *G01L 7/00* | (2006.01) |

(52) U.S. Cl.
CPC ............ *H02K 7/18* (2013.01); *F03B 13/00* (2013.01); *F03B 15/04* (2013.01); *G01F 15/00* (2013.01); *G01F 15/06* (2013.01); *G01L 7/00* (2013.01); *F05B 2220/20* (2013.01); *Y02E 10/226* (2013.01)

(58) Field of Classification Search
CPC ......................................................... F03B 13/00
USPC ........................................................... 290/43
See application file for complete search history.

(56) References Cited

U.S. PATENT DOCUMENTS

| | | | |
|---|---|---|---|
| 4,496,845 A | 1/1985 | Ensign et al. | |
| 4,654,537 A * | 3/1987 | Gaspard ................. | F03B 13/00 290/54 |
| 4,740,711 A | 4/1988 | Sato et al. | |
| 4,809,510 A | 3/1989 | Gaspard et al. | |

(Continued)

FOREIGN PATENT DOCUMENTS

| | | |
|---|---|---|
| CA | 2 744 242 A1 | 5/2010 |
| DE | 101 32 682 C1 | 7/2002 |

(Continued)

*Primary Examiner* — Tulsidas C Patel
*Assistant Examiner* — Charles Reid, Jr.
(74) *Attorney, Agent, or Firm* — Muncy, Geissler, Olds & Lowe, P.C.

(57) ABSTRACT

A method and a device for supplying a measurement electronics system in a fitting, through which a fluid flows, with electrical energy, which is generated in a turbine by the fluid flowing through the filling, wherein the flow quantities and pressures vary within wide boundaries, typically 1:1000. A pressure control device associated with the turbine controls the pressure of the fluid striking the turbine in such a manner that the electrical energy required for operating the measurement electronics system is generated with a small flow quantity, the pressure loss incurred by the fluid while flowing through the fitting being limited to a maximum value.

13 Claims, 1 Drawing Sheet

(56) References Cited

U.S. PATENT DOCUMENTS

| | | | |
|---|---|---|---|
| 4,963,780 A | 10/1990 | Hochstrasser | |
| 6,011,334 A | 1/2000 | Roland | |
| 6,975,043 B2 * | 12/2005 | Schumacher | H02K 7/1892 290/1 R |
| 6,998,724 B2 * | 2/2006 | Johansen | E21B 33/0355 166/65.1 |
| 7,112,892 B2 * | 9/2006 | Mahowald | F23N 5/187 290/43 |
| 7,723,860 B2 * | 5/2010 | Nagler | F03B 13/00 290/43 |
| 7,768,146 B2 * | 8/2010 | Balzano | F03B 13/00 290/43 |

FOREIGN PATENT DOCUMENTS

| | | | |
|---|---|---|---|
| EP | 0 361 333 A1 | 4/1990 | |
| EP | 0 793 330 A1 | 9/1997 | |
| EP | 2 112 371 A1 | 10/2009 | |
| FR | 2653554 A1 * | 4/1991 | G01D 4/004 |
| FR | 2 686 376 A1 | 7/1993 | |
| GB | 1 354 411 | 5/1974 | |
| GB | WO 0107783 A1 * | 2/2001 | G01F 15/00 |
| GB | 2 453 867 A | 4/2009 | |
| IT | WO 2009147691 A1 * | 12/2009 | E03B 7/071 |
| JP | 2004-234431 A | 8/2004 | |
| JP | WO 2005090778 A1 * | 9/2005 | F03B 13/00 |
| WO | WO 85/01337 A1 | 3/1985 | |
| WO | WO 2010/057957 A1 | 5/2010 | |

\* cited by examiner

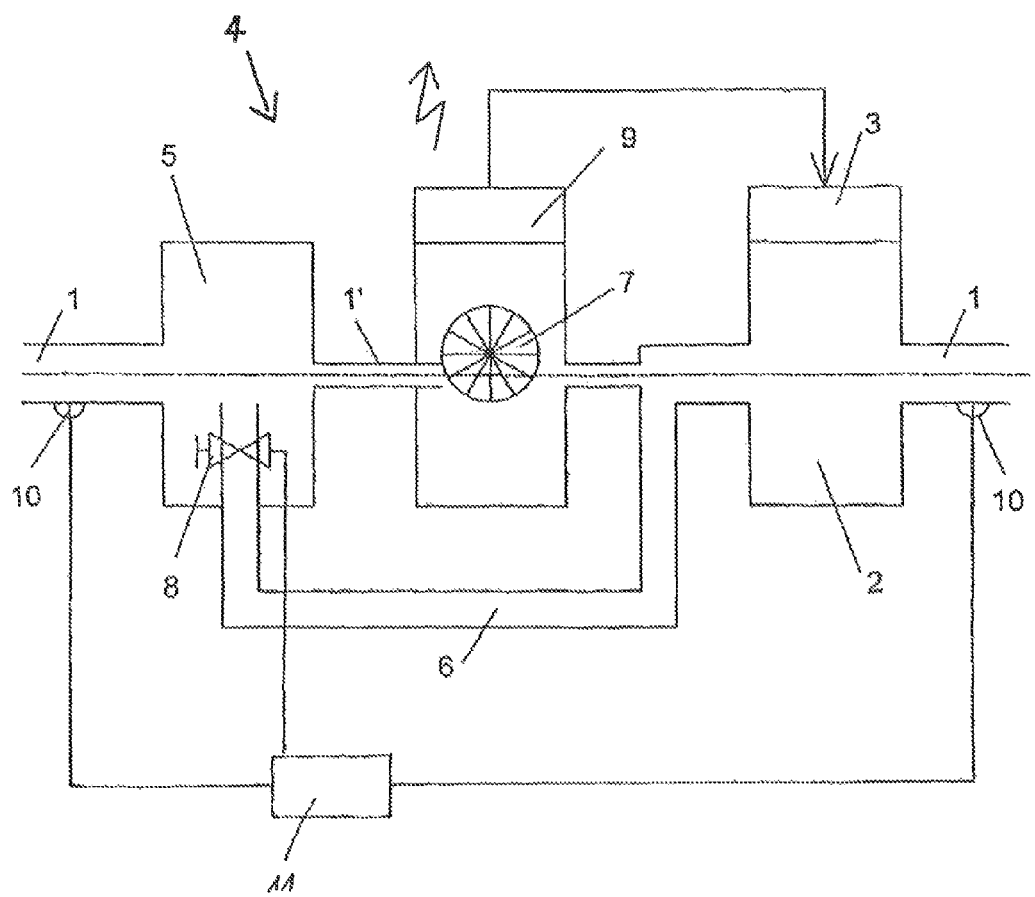

METHOD AND DEVICE FOR SUPPLYING A MEASUREMENT ELECTRONICS SYSTEM WITH ELECTRICAL ENERGY

This nonprovisional application is a continuation of International Application No. PCT/EP2012/002577, which was filed on Jun. 19, 2012, and which is incorporated herein by reference.

BACKGROUND OF THE INVENTION

Field of the Invention

The present invention relates to a method and a device for supplying an electronic measurement system in a fitting, through which a fluid flows, with electric power which the fluid flowing through the fitting generates in a turbine.

Description of the Background Art

Flow meters of all types, for example, in drinking water lines, industrial water lines, natural gas pipelines, pipelines, etc., have the task of monitoring and measuring the flow of the fluid and storing the measured values. This occurred originally with mechanical measuring and storage devices, which had to be read on site. Because reading on site in many cases is laborious, time-consuming, and at times even dangerous, it soon became desirable to transmit stored measured values wirelessly via radio. The electric power required to operate the transmitting and receiving devices was initially provided via power supply lines or batteries. This entails considerable additional expenditures, however. Solutions were therefore sought to reduce this cost.

One solution to the problem is to allow the fluid itself to produce the required electric power. To this end, a turbine that drives a current generator is placed in the pipe through which the fluid flows. The measuring, storing, transmitting, and receiving devices can be operated in this way without electrical supply lines having to be laid or batteries replaced. Compare, for example, GB 1 354 411 A1, FR 2 686 376 A, or U.S. Pat. No. 4,740,711 A.

It is also already known to supply electrical or electronic components in domestic water fittings with current in the same way. Thus, for example, WO 85/01337 A shows a water dispenser whose water flow can be turned on and off by an electrically controllable valve. A turbine wheel, which is impinged by water and drives a low-power electric generator, is disposed in the flow channel of the water dispenser. The generator is connected to a control device which controls the valve and whose battery can be charged with the power supplied by the generator. The flow channel of the water dispenser has a curvature of 90°, whereby the rotation axis of the turbine wheel coincides with the longitudinal axis of the tubular housing bounding the flow channel in this area. The generator is provided with the turbine flush-aligned outside the housing in the area of the 90° curvature, whereby an opening for passing through the generator shaft, coupled to the drive shaft of the turbine wheel, is provided in the housing. The shaft passage is sealed by a stuffing box.

A disadvantageous aspect of this solution in one respect is the need for a stuffing box seal whose lifetime is known to be limited. A further disadvantage is the required battery, because its lifetime is limited as well.

EP 0 361 333 A1, which corresponds to U.S. Pat. No. 4,963,780, shows a similar design. It as well uses a stuffing box seal between the turbine wheel and the current generator.

EP 0 793 330 A1, which corresponds to U.S. Pat. No. 6,011,334, discloses a current generator which can be installed in a pipe through which a fluid flows and which does not use a stuffing box seal. To this end, the pipe is non-magnetic in the area of the generator. A turbine wheel and a permanent magnet coupled to the turbine wheel are located in the interior of the pipe. The coil in which electric power is produced is located outside the pipe.

Comparable current generators are also installed in thermostatic valves of heating systems. Compare WO 2010/057957 A1, JP 2004-234431 A, or DE 101 32 682 C1. These also require batteries, because the hot water flow is interrupted at times.

The solutions described above are based on the principle that has been put into practice for over 100 years worldwide in hydroelectric plants. In this regard, water is held back to the highest possible potential level by a water-retaining structure. The energy of the movement of the flowing-off water is transferred to a water turbine or a water wheel, as a result of which it is caused to rotate at high torque. This in turn is passed on directly or via a gear mechanism to the shaft of a generator which converts the mechanical energy into electric power. The output of the hydroelectric power plants depends on the water flow, the drop height, and on the efficiency of the feed, the water turbine, the gear mechanism, the generator, and the transformer. Modern hydroelectric power plants achieve an efficiency of up to 90%.

Power plants operated with compressed air function according to the same principle.

The hydroelectric and compressed air power plants are thus constructed and controlled such that the turbine and with it the generator run at a constant network rotational speed, irrespective of whether a great deal or little electric power is taken off. At the same time, the generator is controlled so that it delivers a constant supply voltage. Known power plants therefore have a series of electronic and mechanical measuring and control equipment.

In the home, trades, and industry, a great number of consumption meters for fluids are employed, for example, for recording the consumption of fresh water, industrial water, heat, natural gas, oil, oxygen, etc. These measuring devices must function for a certain time, for example, for 5 or 6 years. If these devices are equipped with electronic components for the measurement, storing, and teletransmission of the consumption data, an electric power source is necessary. At present, this is a battery. The fluid-driven generators mentioned above could not gain acceptance for the following reasons.

The main difficulty with the use of fluid-activated generators for supplying consumption measuring devices is the greatly scattering current per unit time. In a water consumption meter at the maximum flow rate of $Q_{max}$=3000 L/h at the maximum allowable pressure loss of 1 bar for water consumption meters, the value $Q_N$=1.5 can be reduced by a maximum hydraulic power of 83 W. A turbine can be driven with this 83 W, which for its part drives the current generator, which can supply its current to the measuring, storing, transmitting, and receiving electronics. In practice, however, the maximum flow rate $Q_{max}$ is achieved only very rarely. Typically, the flow volumes are much lower. The result of this is that the current generator can deliver only a fraction of the indicated maximum power. Thus, the water flow at a flow rate of 300 L/h and a pressure loss of 0.01 bar generates a hydraulic power of only 83 mW. If the flow rate drops even further, the generator no longer generates sufficient current to operate the electronics. At times, the flow rate is zero.

Moreover, water consumption meters are subject to the legal provision that the pressure loss in a water meter may not exceed a predetermined value (at present 1 bar).

SUMMARY OF THE INVENTION

It is therefore an object of the present invention to provide a method and a device that make it possible to supply an electronic measuring system with electric power, which is taken from the flow energy of the fluid itself to be measured, also if the volumetric flow rate of the fluid varies over a broad range, particularly to supply the electronic measuring system reliably with electric power also at a low volumetric flow rate of the fluid, whereby the pressure loss of the fluid to be measured particularly at high flow rates does not exceed a predetermined value.

The present invention is based, in an embodiment, on the realization that the hydraulic power is the product of the pressure loss and volumetric flow rate. At a constant cross section, the hydraulic power rises and falls with the third power of the volumetric flow rate. The method of the invention therefore consists of increasing the hydraulic power at a low flow rate by increasing the pressure loss in order to obtain the electric power necessary for operating the electronic components, whereas at high flow rates the arising pressure loss is reduced to keep the pressure loss within the extent permitted by law.

To be able to comply with this condition, the pressure loss is measured and the fluid flow is accordingly controlled by the power generating device by means of the at least one element for influencing the fluid flow.

There are a number of options for controlling the pressure loss. A first option is to change the cross section of the fluid stream driving the turbine, for example, by means of baffles or flaps. A second option is to allow individual partial amounts of the fluid to be conveyed into a bypass channel.

An object of the present invention is also a device for supplying an electronic measuring system in a fitting, through which a fluid flows, with electric power.

A device according to an embodiment can include a fitting, through which a fluid flows, having an electronic measuring system for measuring the flow rate of the fluid and for storing the measured values, and a power generating device comprising a generator having a fluid-driven turbine, which generates the electric power for the electronic measuring system, whereby the power generating device further comprises a control device, a measuring device for determining the pressure loss in the power generating device, and at least one element for influencing the fluid flow through the power generating device, whereby the control device depending on the determined pressure loss and/or the flow rate determined by the electronic measuring system controls the at least one element for influencing the fluid flow, so that the pressure loss that the fluid in the power generating device experiences does not exceed a predetermined value.

In an embodiment, the at least one element for influencing the fluid flow can convey a partial amount of the fluid into a bypass channel.

Hereby, according to an embodiment, the at least one element for influencing the fluid flow has a gate valve or a valve.

Alternatively or also in addition, the at least one element for influencing the fluid flow can include a component that varies a cross section of the fluid stream driving the turbine. For example, a baffle or a flap can be used, whereby the baffle or flap is advantageously spring-loaded and moved by the impact pressure of the fluid stream.

Finally, there is the option of moving the turbine relative to the fluid stream by the at least one element for influencing the fluid flow, so that the turbine is impinged more or less by the fluid as needed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the sole FIGURE shows a schematic illustration of a complete combination of a pipe, fitting, electronic measuring system, and power generating device with a turbine and generator, whereby the pressure regulation occurs by means of a controlled bypass stream.

DETAILED DESCRIPTION

The FIGURE shows purely schematically a device for carrying out the method of the invention having a pipe 1, through which a fluid flows, a fitting 2 through which a fluid flows and in which the amount of the through-flowing fluid is determined, an electronic measuring system 3 for measuring the volumetric flow rate of the fluid and for storing the measured values and optionally for transmitting and receiving measured data and control signals, and a power generating unit 4.

Power generating unit 4 comprises a turbine 7, driven by the fluid, a generator 9 which generates the electric power for the electronic measuring system 3, a control device 5, a measuring device for determining the pressure loss in power generating device 4, and at least one element for influencing the fluid flow.

Turbine 7 is associated with a pipe 1' with a small cross section. The pressure arising, because of the small cross section of pipe 1', and the flow rate in pipe 1' are selected so that turbine 7 and downstream generator 9 starting at a predetermined minimum flow rate of the fluid generate the electric power needed to operate electronic measuring system 3.

In a fitting with the electronic measuring system, which is used for measuring the flow rate of a fluid such as perhaps water, the predetermined minimum flow rate is preferably within the range close to zero, in order to determine reliably also the minimum flow rates through the fitting.

To control the flow rate of the fluid in pipe 1', control device 5, measuring device 10 for determining the pressure loss in the power generating device, and at least one element for influencing the fluid flow are provided.

In the embodiment shown in the FIGURE, the at least one element for influencing the fluid flow is a controllable valve 8. Controllable valve 8 is assigned to a bypass channel 6 around turbine 7 and opens or closes bypass channel 6 around turbine 7.

Control device 5 receives flow rate values measured by electronic measuring system 3.

If the measured flow rate of the fluid in pipe 1 increases, control device 5 opens valve 8 depending on the measured flow rate. A partial amount of the fluid can thus flow in the opened bypass channel 6 around turbine 7. This assures that turbine 7 is not overloaded.

The measuring device for determining the pressure loss in power generating device 4 comprises, moreover, a suitably disposed pressure sensor 10 to monitor that the pressure loss of the fluid through the entire power generating device 4 does not exceed a predetermined maximum value.

Pressure sensors 10 are connected to a controller block 11, which in turn is connected to control device 5, to control valve 8 depending on the measured pressure difference, particularly to open it wider, if the measured pressure difference exceeds a predetermined value.

In an embodiment, controller block 11 can be integrated into control device 5.

The opening degree of valve 8 thus depends both on the determined flow rate and on the determined pressure difference of the fluid.

If in the embodiment described in the FIGURE the opening degree of the valve depends on both the determined flow rate and the determined pressure difference of the fluid, it is sufficient within the scope of the invention if the opening degree of the valve is controlled only depending on the determined flow rate or the determined pressure difference.

In an alternative embodiment, a turbine inserted in a pipe can be provided with a co-rotating element for influencing the fluid flow. The co-rotating element for influencing the fluid flow can comprise, for example, a predetermined number of 6 baffles. The baffles are triangular and mounted pivotable on a pivot axis. The baffles based on the determined through-flow volume or the determined pressure difference can be pivoted by a pivoting device so that the turbine always removes the hydraulic power from the fluid also at greatly changing flow rates, said power which the generator requires in order to generate at least the electric power necessary for operating the measuring and control electronics, without being overloaded at high flow rates.

Thus, in a starting position of the baffles these offer a high resistance to the fluid stream, so that a correspondingly high hydraulic power can be removed from the fluid. In an end position of the baffles, these are pivoted so far that they offer only a minimum resistance to the fluid flow.

In a further alternative embodiment, the at least one element for influencing the fluid flow is a rotating device on which the turbine is mounted rotatably. Depending on the determined flow rate or pressure loss, the turbine is rotatable relative to the fluid stream in order to produce the necessary flow or to keep the pressure loss in the power generating device below the maximum predetermined pressure loss.

The elements, described in the various embodiments, for influencing the fluid flow can be combined as desired with one another, even if this was not shown.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for supplying a fluid flow rate electronic measuring system in a fitting on a pipe section, through which a fluid flows, with electric power, wherein a flow rate of the fluid flowing through the fitting fluctuates, via a power generating device, the method comprising:
    arranging a generator having a turbine in the pipe section through which the fluid flows, the generator and the fitting being arranged in series, and the generator generating electric power to supply the electronic measuring system, so that the electronic measuring system in the fitting has electric power to measure the flow rate of the fluid;
    providing a control device; and
    providing at least one element for influencing the fluid flow through the power generating device,
    wherein the turbine of the generator generates electric power starting at a predetermined minimum flow rate of the fluid through the fitting,
    wherein a pressure loss of the fluid that the fluid experiences in the power generating device is determined by measuring pressure at a position upstream of both the generator and the fitting and at a position downstream of both the generator and the fitting, and
    wherein the control device, depending on the determined pressure loss and/or the flow rate measured by the electronic measuring system in the fitting, controls the at least one element for influencing the fluid flow so that the pressure loss that the fluid in the power generating device experiences does not exceed a predetermined value.

2. The method according to claim 1, wherein a value of the predetermined minimum flow rate is close to zero.

3. The method according to claim 1, wherein the at least one element for influencing the fluid flow changes a cross section of the fluid stream driving the turbine.

4. The method according to claim 1, wherein the at least one element for influencing the fluid flow conveys a partial amount of the fluid into a bypass channel.

5. A device for supplying an electronic measuring system in a fitting on a pipe section through which a fluid flows with electric power, the device comprising:
    the fitting on the pipe section through which a fluid flows;
    the electronic measuring system, provided in the fitting, for measuring a flow rate of the fluid and for storing measured values;
    a power generating device comprising:
        a generator having a fluid-driven turbine that generates the electric power for the electronic measuring system, so that the electronic measuring system in the fitting has electric power to measure the flow rate of the fluid, wherein the generator and the fitting are arranged in series;
        a control device;
        a measuring device for determining a pressure loss in the power generating device by measuring pressure at a position upstream of both the generator and the fitting and at a position downstream of both the generator and the fitting, and
        at least one element for influencing the fluid flow through the power generating device,
    wherein the control device, depending on the determined pressure loss and/or the flow rate measured by the electronic measuring system, controls the at least one element for influencing the fluid flow so that the pressure loss that the fluid in the power generating device experiences does not exceed a predetermined value.

6. The device according to claim 5, wherein the at least one element for influencing the fluid flow is assigned to a bypass channel in order to convey a partial amount of the fluid into the bypass channel.

7. The device according to claim 6, wherein the at least one element for influencing the fluid flow comprises a gate valve or a valve.

8. The device according to claim 5, wherein the at least one element for influencing the fluid flow comprises a component that varies the cross section of the fluid stream driving the turbine.

9. The device according to claim 8, wherein the at least one element for influencing the fluid flow comprises a baffle or flap.

10. The device according to claim 9, wherein the flap is spring-loaded.

11. The device according to claim 5, wherein the turbine is movable relative to the fluid stream by at least one element for influencing the fluid flow.

12. The method according to claim 1, wherein the control device controls the at least one element for influencing the fluid flow based on both the determined pressure loss and the flow rate measured by the electronic measuring system.

13. The device according to claim 5, wherein the control device controls the at least one element for influencing the fluid flow based on both the determined pressure loss and the flow rate measured by the electronic measuring system.

* * * * *